(12) United States Patent
Horiuchi et al.

(10) Patent No.: US 12,525,026 B2
(45) Date of Patent: Jan. 13, 2026

(54) INFORMATION PROCESSING APPARATUS, MOVING OBJECT, SYSTEM, INFORMATION PROCESSING METHOD, AND SERVER

(71) Applicant: HONDA MOTOR CO.,LTD., Tokyo (JP)

(72) Inventors: Moriya Horiuchi, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 370 days.

(21) Appl. No.: 18/187,681

(22) Filed: Mar. 22, 2023

(65) Prior Publication Data

US 2023/0306752 A1 Sep. 28, 2023

(30) Foreign Application Priority Data

Mar. 28, 2022 (JP) .................. 2022-052391

(51) Int. Cl.
*G06V 20/58* (2022.01)
*G06T 7/246* (2017.01)
*G06V 10/94* (2022.01)

(52) U.S. Cl.
CPC .............. *G06V 20/58* (2022.01); *G06T 7/248* (2017.01); *G06V 10/95* (2022.01); *G06T 2207/30261* (2013.01)

(58) Field of Classification Search
CPC ........ G06V 20/58; G06V 10/95; G06T 7/248; G06T 2207/30261
See application file for complete search history.

(56) References Cited

U.S. PATENT DOCUMENTS

| 2014/0037138 A1* | 2/2014 | Sato ........................ G06V 20/58 382/103 |
| 2017/0262750 A1* | 9/2017 | Kozuka ................. G06V 20/58 |
| 2021/0053563 A1* | 2/2021 | Li ......................... G05D 1/0212 |
| 2021/0192942 A1 | 6/2021 | Koga |

(Continued)

FOREIGN PATENT DOCUMENTS

| CN | 112740298 A | 4/2021 |
| CN | 114187778 A | 3/2022 |
| JP | 2021140470 A | 9/2021 |

OTHER PUBLICATIONS

Office Action issued for counterpart Chinese Application 202310141688.4, issued by the State Intellectual Property Office of People's Republic of China on Sep. 30, 2025.

*Primary Examiner* — Vu Le
*Assistant Examiner* — Rachel Anne Ometz

(57) ABSTRACT

An information processing apparatus includes: a risk area identification unit configured to identify a risk area outside a moving object; and a transmission control unit configured to perform control for transmitting risk area information representing the risk area identified by the risk area identification unit to a server configured to retain information related to a risk area, in which the risk area identification unit is configured to identify an area defined by a plurality of points as the risk area, and the transmission control unit is configured to perform control for transmitting coordinate information of some of the plurality of points to the server as the risk area information.

16 Claims, 10 Drawing Sheets

(56) References Cited

U.S. PATENT DOCUMENTS

| | | |
|---|---|---|
| 2021/0281968 A1 | 9/2021 | Kurehashi |
| 2022/0084409 A1 | 3/2022 | Kurehashi |
| 2022/0084410 A1 | 3/2022 | Kurehashi |
| 2022/0262128 A1* | 8/2022 | Nakamura ............. G08G 1/166 |
| 2023/0211778 A1* | 7/2023 | Kim ....................... G06V 10/82 |
| | | 701/301 |
| 2024/0010194 A1* | 1/2024 | Reimker ............. B60W 30/095 |

* cited by examiner

INFORMATION PROCESSING APPARATUS, MOVING OBJECT, SYSTEM, INFORMATION PROCESSING METHOD, AND SERVER

The contents of the following Japanese patent application(s) are incorporated herein by reference:
NO. 2022-052391 filed on Mar. 28, 2022.

BACKGROUND

1. Technical Field

The present invention relates to an information processing apparatus, a moving object, a system, an information processing method, and a server.

2. Related Art

Patent Document 1 describes a system in which a MEC server manages a risk area, and the MEC server provides information on the risk area to each vehicle.

PRIOR ART DOCUMENT

Patent Document 1: Japanese Patent Application Publication No. 2021-140470

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential for a solving means of the invention.

Figure 1:
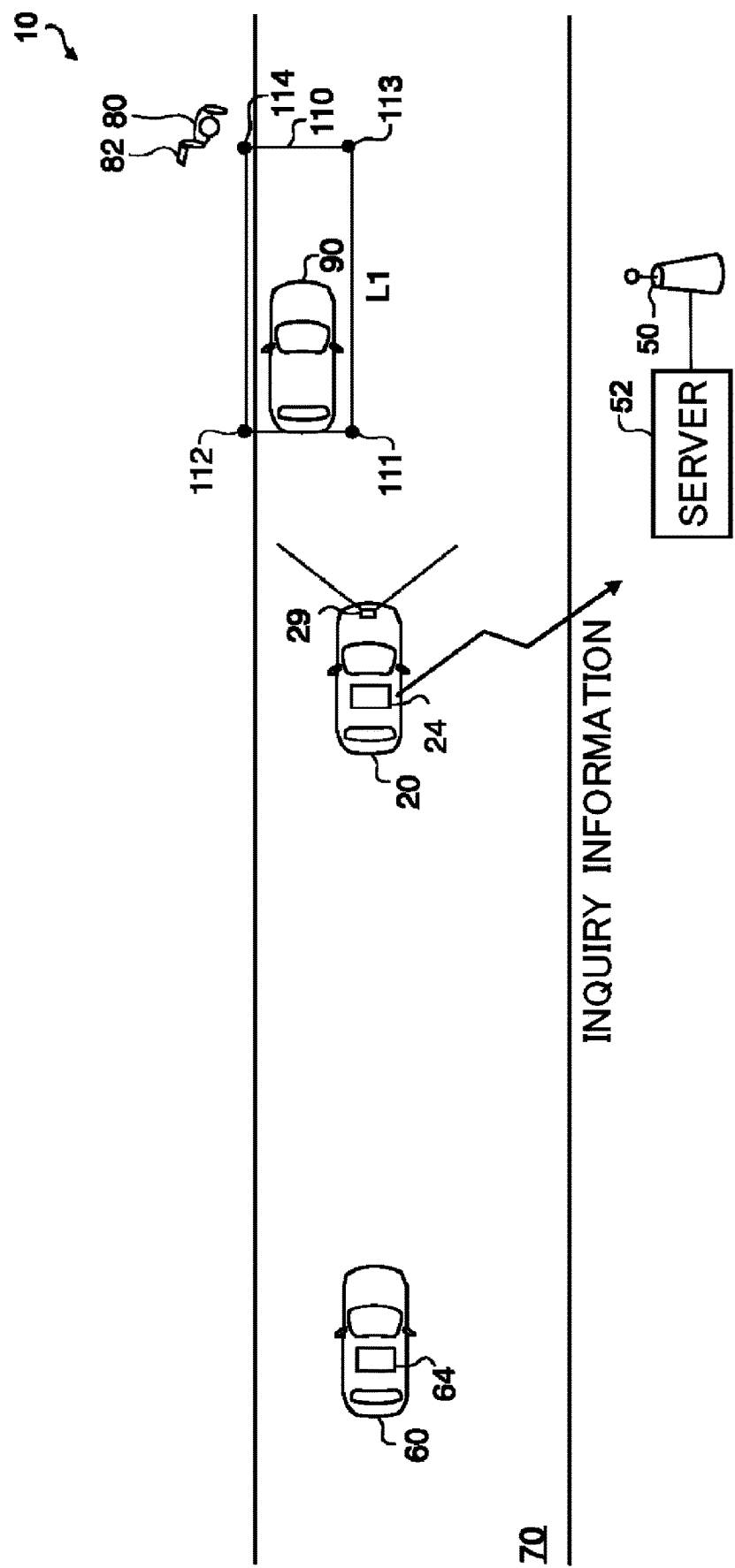
FIG. 1 schematically illustrates a usage scene of a system 10.

FIG. 1 schematically illustrates a usage scene of a system 10. The system 10 includes a vehicle 20, a vehicle 60, a terminal 82, a base station 50, and a server 52.

The vehicle 20 and the vehicle 60 are vehicles traveling on a road 70. The vehicle 20 and the vehicle 60 are each an example of a moving object. The vehicle 20 includes an information processing apparatus 24 and a sensor 29. The sensor 29 is constituted by including a camera. The information processing apparatus 24 has a function of processing information acquired by the sensor 29 and a communication function with the server 52. The vehicle 20 is a vehicle having, for example, an advanced driver-assistance systems (ADAS) function. The vehicle 60 includes an information processing apparatus 64. The information processing apparatus 64 has a communication function with the server 52. The vehicle 60 is a vehicle that does not have the ADAS function, for example.

The terminal 82 is a terminal possessed by a person 80. The terminal 82 is, for example, a mobile terminal such as a smartphone. The base station 50 is a base station for mobile communication. The server 52 is a server connected to the base station 50. The server 52 may include an edge computing server such as a mobile edge computing (MEC) server, for example. The server 52 continuously manages location information of the terminal 82. It is to be noted that although FIG. 1 illustrates one server 52, the server 52 may be constituted by a plurality of servers respectively connected to a plurality of base stations on a one-on-one basis. The information processing apparatus 24 may communicate with a server in the vicinity of the vehicle 20 out of the plurality of servers constituting the server 52, and the information processing apparatus 64 may communicate with a server in the vicinity of the vehicle 60 out of the plurality of servers constituting the server 52.

In FIG. 1, the vehicle 20 and the vehicle 60 are vehicles travelling along the road 70. A vehicle 90 is a vehicle parked on the road 70. The vehicle 60 travels behind the vehicle 20 in the same traveling direction as the vehicle 20.

For the vehicle 20, an area 110 on the traveling direction side of the vehicle 20 in front of the parked vehicle 90 is an area that is difficult to be visually recognized from a position of the vehicle 20. The information processing apparatus 24 identifies the area 110 that cannot be clearly viewed from the vehicle 20 as a risk area, based on information such as an image in a traveling direction acquired by the sensor 29.

For example, the information processing apparatus 24 determines four vertexes 111, 112, 113, and 114 of a quadrangular area 110 including the position of the vehicle 90 based on recognition information of an image acquired by the sensor 29. The vertex 113 is a point apart from the vertex 111 determined based on the recognition information of the image by a distance L1 in the traveling direction of the vehicle 20. The vertex 114 is a point apart from the vertex 112 determined based on the recognition information of the image by the distance L1 in the traveling direction of the vehicle 20. L1 is a distance that has been determined according to a vehicle speed of the vehicle 20.

When inquiring the server 52 of whether the person 80 or the terminal 82 is present in the area 110, the information processing apparatus 24 transmits inquiry information including the four vertexes 111, 112, 113, and 114 to the server 52. Regarding the location information of the person 80, location information acquired by an in-vehicle camera or an infrastructure camera, for example, may be transmitted to and managed by the server 52. It is to be noted that the inquiry information is an example of risk area information including the vertex 111 and the vertex 112. Since a terminal is not present in the area 110 defined by the four vertexes 111, 112, 113, and 114 in the example shown in FIG. 1, the server 52 discards the inquiry information or transmits response information notifying that the terminal 82 is not present to the vehicle 20.

Out of the four vertexes 111, 112, 113, and 114 included in the inquiry information received from the information processing apparatus 24, the server 52 stores coordinate information of the vertex 111 and the vertex 112 positioned closer to the vehicle 20, and provides the coordinate information to other vehicles including the vehicle 60 behind the vehicle 20. It is to be noted that when registering a risk area in the server 52, the information processing apparatus 24 may transmit, as the risk area information, the coordinate information of the vertex 111 and the vertex 112 positioned closer to the vehicle 20 out of the four vertexes 111, 112, 113, and 114 to the server 52. In this case, the server 52 stores the coordinate information of the vertex 111 and the vertex 112 included in the risk area information received from the information processing apparatus 24, and provides the coordinate information to other vehicles including the vehicle 60.

Figure 2:
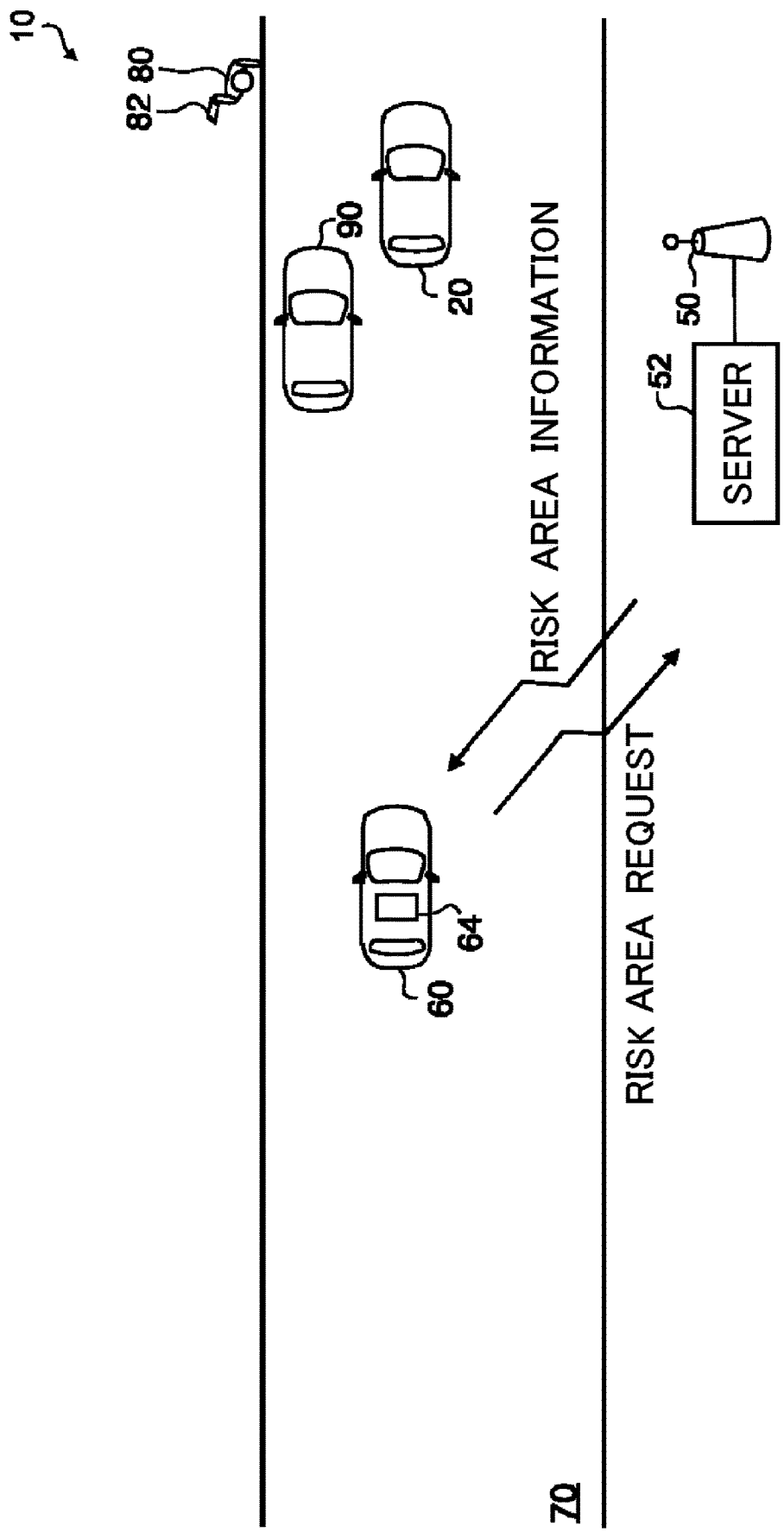
FIG. 2 illustrates a situation where an information processing apparatus 64 included in a vehicle 60 requests location information of a risk area.

FIG. 2 illustrates a situation where the information processing apparatus 64 included in the vehicle 60 requests location information of a risk area. The information processing apparatus 64 transmits a risk area request to the server 52 when being present in an area in which the information processing apparatus 64 is communicable with the server 52. The server 52 transmits the stored coordinate information of the vertex 111 and the vertex 112 of the area 110 to the information processing apparatus 64. The information processing apparatus 64 stores the coordinate information of the vertex 111 and the vertex 112 received from the server 52.

Figure 3:
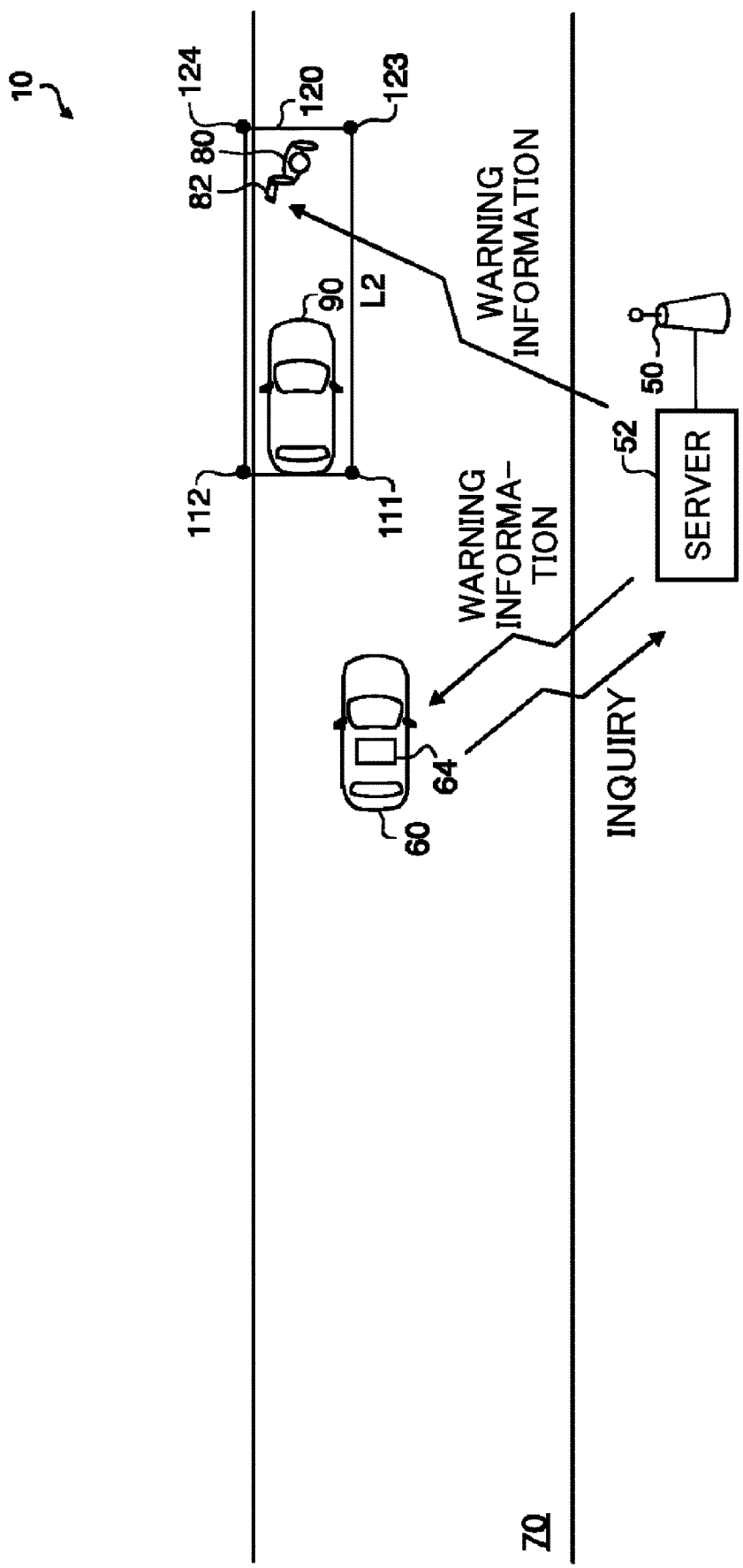
FIG. 3 illustrates a situation where the information processing apparatus 64 performs an inquiry related to the risk area.

FIG. 3 illustrates a situation where the information processing apparatus 64 performs an inquiry related to a risk area. When a distance between the vehicle 20 and a position represented by the coordinate information of at least one of the vertex 111 or the vertex 112 becomes smaller than a predetermined distance, the information processing apparatus 64 sets an area 120 defined by the vertex 111, the vertex 112, a vertex 123, and a vertex 124, as a risk area for the vehicle 60. For example, the information processing apparatus 64 determines, as the vertex 123, a point apart from the vertex 111 in the traveling direction of the vehicle 60 by a distance L2 that has been determined according to the vehicle speed of the vehicle 60, and determines, as the vertex 124, a point apart from the vertex 112 in the traveling direction of the vehicle 60 by the distance L2.

The information processing apparatus 64 transmits inquiry information including coordinate information of the vertex 111, the vertex 112, the vertex 123, and the vertex 124 of the area 120 set as the risk area to the server 52. When the area 120 surrounded by the vertexes included in the inquiry information includes location information of the terminal 82 managed by the server 52, the server 52 transmits warning information to the information processing apparatus 64 and the terminal 82. Upon receiving the warning information from the server 52, the information processing apparatus 64 outputs a warning to a passenger of the vehicle 60. For example, the information processing apparatus 64 outputs a warning to the passenger using an HMI (Human Machine Interface) function of the vehicle 20. Accordingly, even when the information processing apparatus 64 itself does not have a function of recognizing a risk area by sensing means such as a camera, the information processing apparatus 64 can output a warning using the risk area received from the server 52 using a wireless communication function. In addition, upon receiving the warning information from the server 52, the terminal 82 outputs a warning to the person 80. For example, the terminal 82 outputs a warning to the person 80 using an HMI function of the terminal 82.

In this manner, the server 52 stores two vertexes out of the four vertexes defining the area 110 identified by the vehicle 20. Accordingly, a storage capacity requisite for managing a risk area can be reduced as compared to a case where the server 52 stores coordinate information of the four vertexes of the area 110. Moreover, the server 52 transmits coordinate information of the two vertexes stored in the server 52 to the information processing apparatus 64. Accordingly, a communication amount requisite for providing coordinate information of the risk area to another vehicle 60 can be reduced as compared to a case where the server 52 transmits coordinate information of the four vertexes of the area 110 to the information processing apparatus 64. In addition, since the area 120 corresponding to the vehicle speed of the vehicle 60 is set based on the coordinate information of the two vertexes of the area 110 received from the server 52, the information processing apparatus 64 can set an appropriate area 120 corresponding to the vehicle speed of the vehicle 60 even without receiving the four pieces of coordinate information of the area 110. Furthermore, since the information processing apparatus 24 transmits the two vertexes out of the four vertexes defining the area 110 when transmitting the risk area information for registering the risk area in the server 52, a communication amount requisite for registering the risk area in the server 52 can be reduced as compared to the case where the coordinate information of the four vertexes of the area 110 is transmitted to the server 52.

Figure 4:
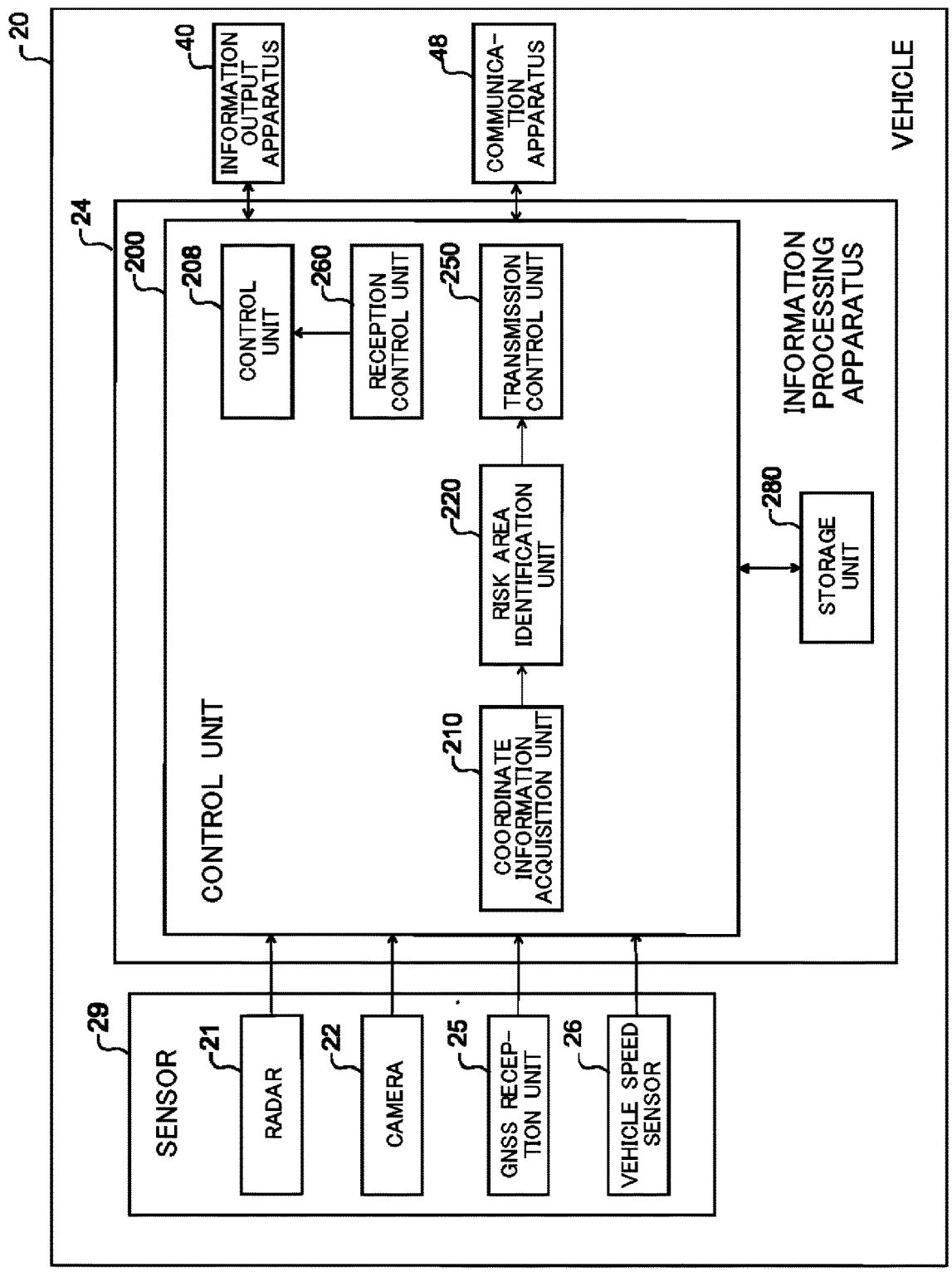
FIG. 4 illustrates a system configuration of a vehicle 20.

FIG. 4 illustrates a system configuration of the vehicle 20. The vehicle 20 includes the sensor 29, the information processing apparatus 24, a communication apparatus 48, and an information output apparatus 40.

The sensor 29 includes a radar 21, a camera 22, a GNSS reception unit 25, and a vehicle speed sensor 26. The radar 21 may be LiDAR, a millimeter wave radar, or the like. The GNSS reception unit 25 receives radio waves transmitted from a GNSS (Global Navigation Satellite System) satellite. The GNSS reception unit 25 generates information representing a current position of the vehicle 20 based on a signal received from the GNSS satellite. The camera 22 is an example of an image capturing apparatus mounted on the vehicle 20. The camera 22 captures a periphery of the vehicle 20 and generates image information. For example, the camera 22 captures an image in the traveling direction of the vehicle 20 and generates image information. The camera 22 may be a monocular camera. The camera 22 may be a compound eye camera, or may be a camera capable of acquiring distance information to an object. The camera 22 recognizes an object based on an image acquired by an image capturing function, and outputs location information of the recognized object. The vehicle speed sensor 26 detects a vehicle speed of the vehicle 20. It is to be noted that the sensor 29 may include a position sensor such as an odometer and an IMU (inertial measurement unit) such as an acceleration sensor and a posture sensor.

It is to be noted that the vehicle 20 may include a driver assistance control apparatus that performs driver assistance of the vehicle 20 using information detected by the sensor 29. The driver assistance control apparatus may be realized by an ECU that provides the ADAS function.

The communication apparatus 48 is responsible for communication with the server 52. The communication apparatus 48 may communicate with the server 52 by mobile communication. The communication apparatus 48 may be communicable through an interface for communication via a mobile base station for vehicle-to-vehicle communication (Uu), for example.

The information output apparatus 40 is an apparatus that outputs warning information. The information output apparatus 40 may have an HMI function. The information output apparatus 40 may include a head-up display and a navigation system. The information output apparatus 40 may be a mobile terminal possessed by a passenger of the vehicle 20. The information output apparatus 40 may include a sound output apparatus that outputs warning information by sound.

The information processing apparatus 24 includes a control unit 200 and a storage unit 280. The control unit 200 is realized by, for example, a circuit of an arithmetic processing apparatus including a processor, and the like. The storage unit 280 is realized by including a nonvolatile storage medium. The control unit 200 performs processing by using information stored in the storage unit 280. The control unit 200 may be realized by an ECU (Electronic Control Unit) including a microcomputer which includes a CPU, a ROM, a RAM, an I/O, a bus, and the like.

The control unit 200 includes a coordinate information acquisition unit 210, a risk area identification unit 220, a control unit 208, a transmission control unit 250, and a reception control unit 260. It is to be noted that a configuration may be adopted in which the control unit 200 does not have some functions in the functional blocks shown in FIG. 4. For example, a configuration may be adopted in which only some of the functions are implemented in the control unit 200, and other functions are implemented as functions of other circuits such as the sensor 29.

The risk area identification unit 220 identifies a risk area outside the vehicle 20. The transmission control unit 250 performs control for transmitting risk area information representing a risk area identified by the risk area identification unit 220 to the server 52 which retains information related to the risk area. The risk area identification unit 220 may identify an area defined by a plurality of points as a risk area, and the transmission control unit 250 may perform control for transmitting coordinate information of some of the plurality of points to the server 52 as risk area information.

It is to be noted that the risk area may be an area outside the vehicle 20, which becomes a risk regarding a movement of the vehicle 20. The risk area may be an area that cannot be clearly viewed from the position of the vehicle 20 due to an object outside the vehicle 20. The area that cannot be clearly viewed is, for example, location information of an area where occlusion has occurred due to blocking by a three-dimensional object such as another vehicle, a building, and a roadside tree when seen from the position of the vehicle 20.

The above-described some points may be points that satisfy a predetermined condition out of the plurality of points. The number of the plurality of points is three or more, and the above-described some points may be two points out of the plurality of points. The above-described some points may be two points closest to the position of the vehicle 20 out of the plurality of points.

The above-described some points may be two points farthest apart from each other in a direction intersecting with the traveling direction of the vehicle 20 out of the plurality of points. For example, the above-described some points may be two points farthest apart from each other in a direction orthogonal to the traveling direction of the vehicle 20 out of the plurality of points. Specifically, the above-described some points may be, for example, a point on a side closest to a center line of the road 70 on which the vehicle 20 travels and a point on a side farthest from the center line of the road on which the vehicle 20 travels. It is to be noted that, out of the plurality of points, when two or more points are present on the side closest to the center line of the road 70 on which the vehicle 20 travels, one point closest to the position of the vehicle 20 may be selected from the points closest to the center line. Out of the plurality of points, when two or more points are present on the side farthest from the center line of the road 70 on which the vehicle 20 travels, one point closest to the position of the vehicle 20 may be selected from the points farthest from the center line.

The coordinate information acquisition unit 210 acquires coordinate information of an object recognized from an image obtained by capturing an outside of the vehicle 20 by the camera 22 mounted on the vehicle 20. The risk area identification unit 220 may identify the risk area based on the coordinate information of the object recognized from the image obtained by capturing the outside of the vehicle 20 by the camera 22.

The coordinate information may include, as coordinates of each of a plurality of points defining the position of the object, first relative coordinates in a first direction along the traveling direction of the vehicle 20 and second relative coordinates in a second direction intersecting with the first direction. The second direction may be a direction orthogonal to the first direction. The number of the plurality of points may be three or more. The risk area identification unit 220 may identify an area defined by the three or more points included in the coordinate information as the risk area based on the coordinate information of the object recognized from the image capturing the outside of the vehicle 20. The transmission control unit 250 may select two points closest to the position of the vehicle 20 from the three or more points based on the first relative coordinates included in the coordinate information, and determine the above-described some points based on the selected two points.

The plurality of points may be a plurality of vertexes defining the area identified as the risk area.

The control unit 208 may perform control to execute driver assistance of the vehicle 20 or warning to the passenger of the vehicle 20. For example, when the information output apparatus 40 includes a head-up display, the control unit 208 may cause the head-up display of the vehicle 20 to output light for forming a mark as warning information representing that a pedestrian is present in the risk area. In addition, the control unit 208 causes the head-up display to output light for forming a mark in a display area corresponding to a position of the risk area in which the pedestrian is present. The control unit 208 may project the light for forming a mark toward a reflective member provided to a windshield of the vehicle 20. It is to be noted that the control unit 208 may output warning information by sound or characters. Further, the control unit 208 may control traveling of the vehicle 20 through the driver assistance control apparatus included in the vehicle 20.

Figure 5:
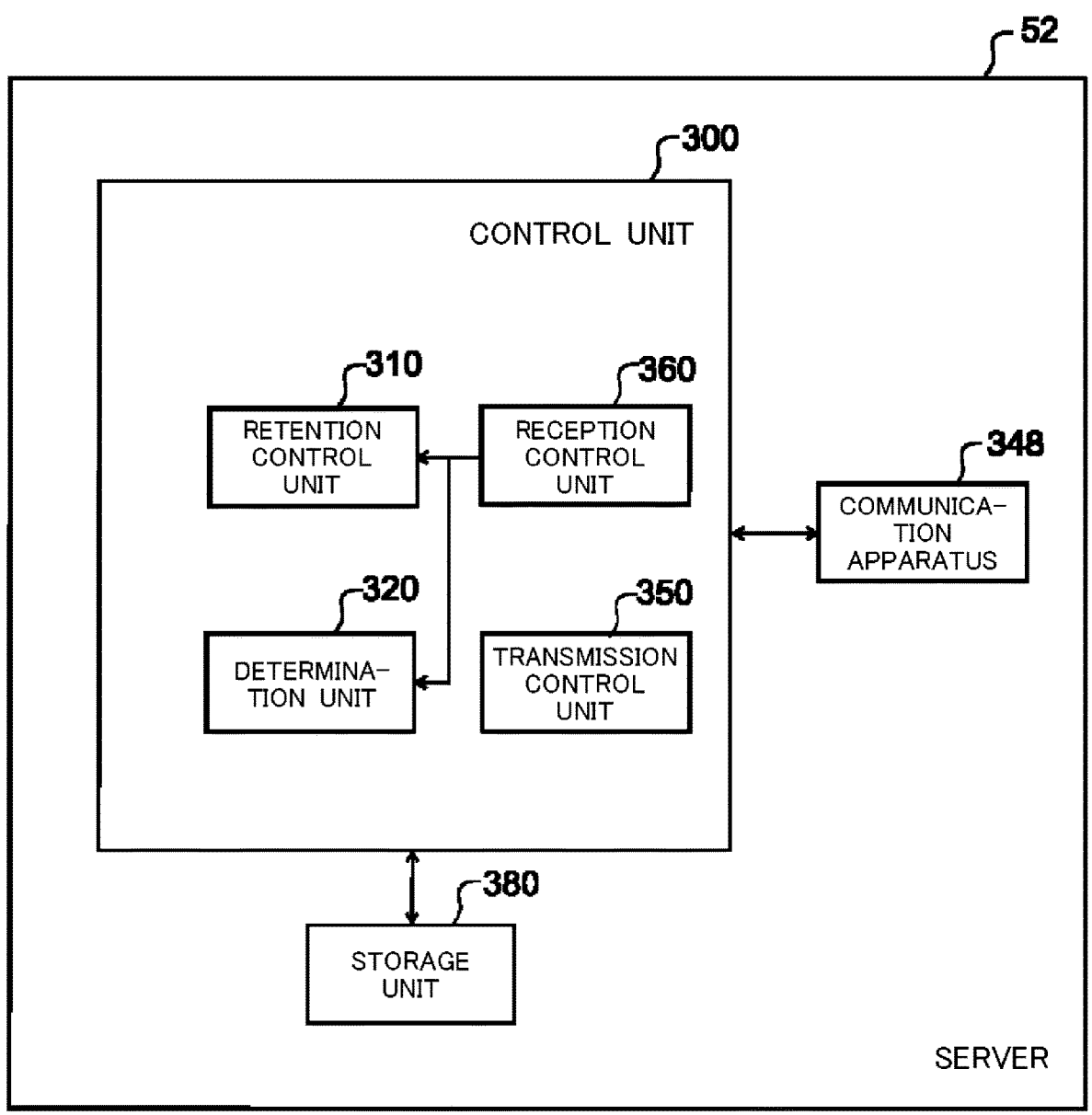
FIG. 5 illustrates a system configuration of a server 52.

FIG. 5 illustrates a system configuration of the server 52. The server 52 includes a communication apparatus 348, a control unit 300, and a storage unit 380.

The control unit 300 performs control of the communication apparatus 348. The communication apparatus 348 is responsible for communication with the terminal 82 and the information processing apparatus 24. The control unit 300 is realized by, for example, a circuit of an arithmetic processing apparatus including a processor, and the like. The storage unit 380 is realized by including a nonvolatile storage medium. The control unit 300 performs processing by using information stored in the storage unit 380. The control unit 300 may be realized by a microcomputer including a CPU, a ROM, a RAM, an I/O, a bus, and the like.

The control unit 300 includes a retention control unit 310, a determination unit 320, a transmission control unit 350, and a reception control unit 360. It is to be noted that a configuration may be adopted in which the control unit 300 does not have some functions in the functional blocks shown in FIG. 5.

The reception control unit 360 performs control for receiving risk area information representing a risk area outside the vehicle 20, that has been identified by the vehicle 20. The retention control unit 310 performs control for retaining information related to the risk area. For example, the retention control unit 310 causes the storage unit 380 to store the information related to the risk area. The risk area information includes a plurality of points defining the risk area. The retention control unit 310 performs control for selecting some of the plurality of points included in the risk area information, and retaining coordinate information of the selected some points.

The reception control unit 360 performs control for periodically receiving location information of a plurality of terminals including the terminal 82. By storing the location information of the plurality of terminals received under control of the reception control unit 360 in the storage unit 380, the server 52 manages the location information of each of the plurality of terminals.

The reception control unit 360 receives inquiry information related to the risk area from the vehicle 20 or the vehicle 60. The inquiry information is information transmitted from the vehicle 20 or the vehicle 60, and is information for inquiring whether any of the terminals whose location information is managed by the server 52 is present in the risk area. The inquiry information may include all coordinates of the plurality of vertexes defining the risk area. Based on the location information managed by the server 52, the determination unit 320 determines whether any of the terminals is present in the risk area defined by the plurality of vertexes included in the inquiry information. When determining that one of the terminals is present in the risk area, the transmission control unit 250 performs control for transmitting response information notifying that the terminal is present to the vehicle 20 or the vehicle 60 as a transmission source of the inquiry information.

Figure 6:
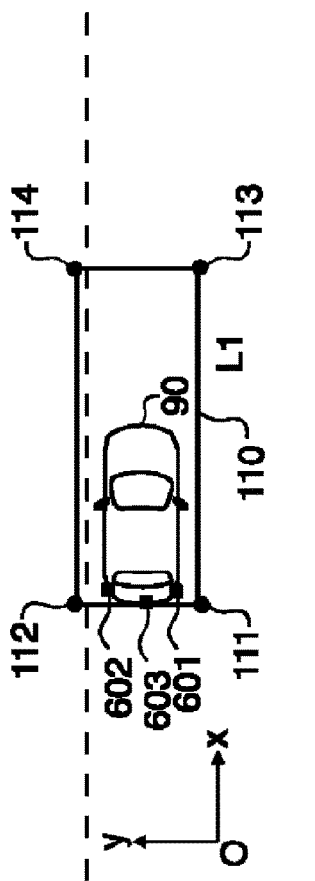
FIG. 6 schematically illustrates a risk area identified by a risk area identification unit 220.

FIG. 6 schematically illustrates a risk area identified by the risk area identification unit 220. FIG. 6 illustrates an example of identifying a rectangular area as the risk area.

The sensor 29 outputs coordinate information representing a position at which an object recognized by the sensor 29 is present. For example, using a coordinate system in which the traveling direction of the vehicle 20 is set as an x axis plus direction and a direction that is parallel to a plane parallel to a road surface on which the vehicle 20 travels and is orthogonal to the x axis is set as a y axis direction, for example, the sensor 29 outputs coordinate information of a position at which the object is present. A point of origin O of the coordinate system is set at a position preset in the vehicle 20. For example, in the example shown in FIG. 6, the sensor 29 outputs coordinate information including coordinates of a position 601, coordinates of a position 602, and coordinates of a position 603. The position 601 is a position most on a y direction minus side out of the positions at which the object has been recognized by the sensor 29, the position 602 is a position most on a y axis plus side out of the positions at which the object has been recognized by the sensor 29, and the position 603 is a position most on an x direction minus side out of the positions at which the object has been recognized by the sensor 29. That is, the position 603 is a position closest to the vehicle 20 out of the positions at which the object has been recognized by the sensor 29.

The risk area identification unit 220 identifies an area 110 as the risk area based on the coordinate information acquired by the coordinate information acquisition unit 210. The area 110 is a rectangular area defined by connecting the vertex 111, the vertex 112, the vertex 114, and the vertex 113. One side of the area 110 on the vehicle 20 side is a side that includes the position 603 and is parallel to the y axis. One side of the area 110 on the vehicle 20 side is defined by the vertex 111 and the vertex 112. The vertex 111 is determined at a position that is equal to the position 601 or that has passed beyond the position 601 by a predetermined amount in the y axis minus direction. The vertex 112 is determined at a position that is equal to the position 602 or that has passed beyond the position 602 by a predetermined amount in the y axis plus direction. In the example shown in FIG. 6, the vertex 111 is determined at a position that has passed beyond the position 601 by a predetermined amount in the y axis minus direction, and the vertex 112 is determined at a position that has passed beyond the position 602 by a predetermined amount in the y axis plus direction. The vertex 113 is determined at a position apart from the vertex 111 by the distance L1 in the x axis plus direction. The vertex 114 is determined at a position apart from the vertex 112 by the distance L1 in the x axis plus direction. L1 is determined according to the vehicle speed of the vehicle 20. L1 is determined such that it becomes longer as the vehicle speed of the vehicle 20 becomes higher.

Figure 7:
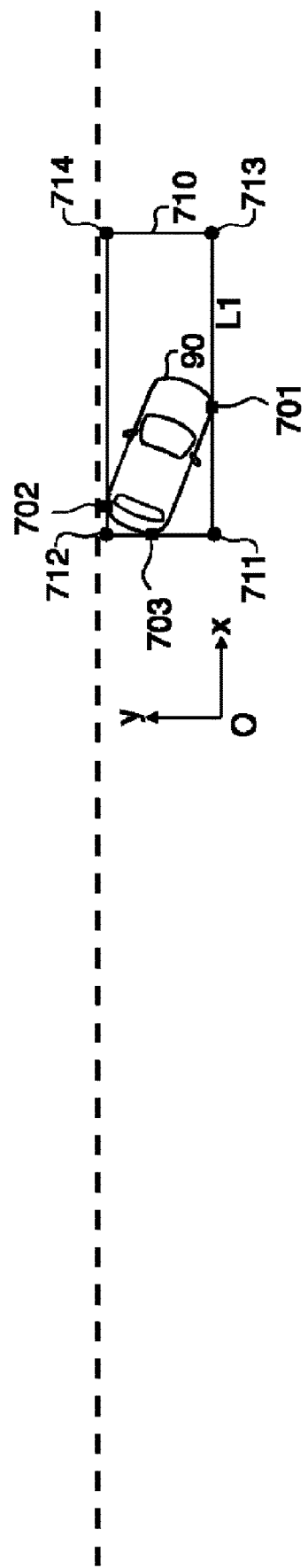
FIG. 7 schematically illustrates another example of the risk area identified by the risk area identification unit 220.

FIG. 7 schematically illustrates another example of the risk area identified by the risk area identification unit 220. FIG. 7 illustrates another example of the rectangular area identified as the risk area.

In the example shown in FIG. 7, the sensor 29 outputs coordinate information including coordinates of a position 701, coordinates of a position 702, and coordinates of a position 703. The position 701 is a position most on the y direction minus side out of the positions at which the object has been recognized by the sensor 29, the position 702 is a position most on the y axis plus side out of the positions at which the object has been recognized by the sensor 29, and the position 703 is a position most on the x direction minus side out of the positions at which the object has been recognized by the sensor 29. The position 703 is a position closest to the vehicle 20 out of the positions at which the object has been recognized by the sensor 29.

The risk area identification unit 220 identifies an area 710 as the risk area based on the coordinate information acquired by the coordinate information acquisition unit 210. The area 710 is a rectangular area defined by connecting a vertex 711, a vertex 712, a vertex 714, and a vertex 713. One side of the area 710 on the vehicle 20 side is a side that includes the position 703 and is parallel to the y axis. One side of the area 710 on the vehicle 20 side is defined by the vertex 711 and the vertex 712. The vertex 711 is determined at a position that is at least equal to the position 701 or that has passed beyond the position 701 by a predetermined amount in the y axis minus direction. The vertex 712 is determined at a position that is at least equal to the position 702 or that has passed beyond the position 702 by a predetermined amount in the y axis plus direction. In the example shown in FIG. 7, the vertex 711 is determined at the same position as the position 701 in the y axis minus direction, and the vertex 712 is determined at the same position as the position 702 in the y axis plus direction. The vertex 713 is determined at a position apart from the vertex 711 by the distance L1 in the x axis plus direction. The vertex 714 is determined at a position apart from the vertex 712 by the distance L1 in the x axis plus direction.

As shown in FIGS. 6 and 7, the risk area identification unit 220 identifies, as the risk area, an area including at least the position of the vehicle 90 recognized by the sensor 29. FIGS. 6 and 7 have exemplified the case where the risk area identification unit 220 identifies a rectangular area as the risk area. However, the area set as the risk area by the risk area identification unit 220 may be a quadrangular area including a parallelogram and the like. The area set as the risk area by the risk area identification unit 220 may be a polygonal area.

Figure 8:
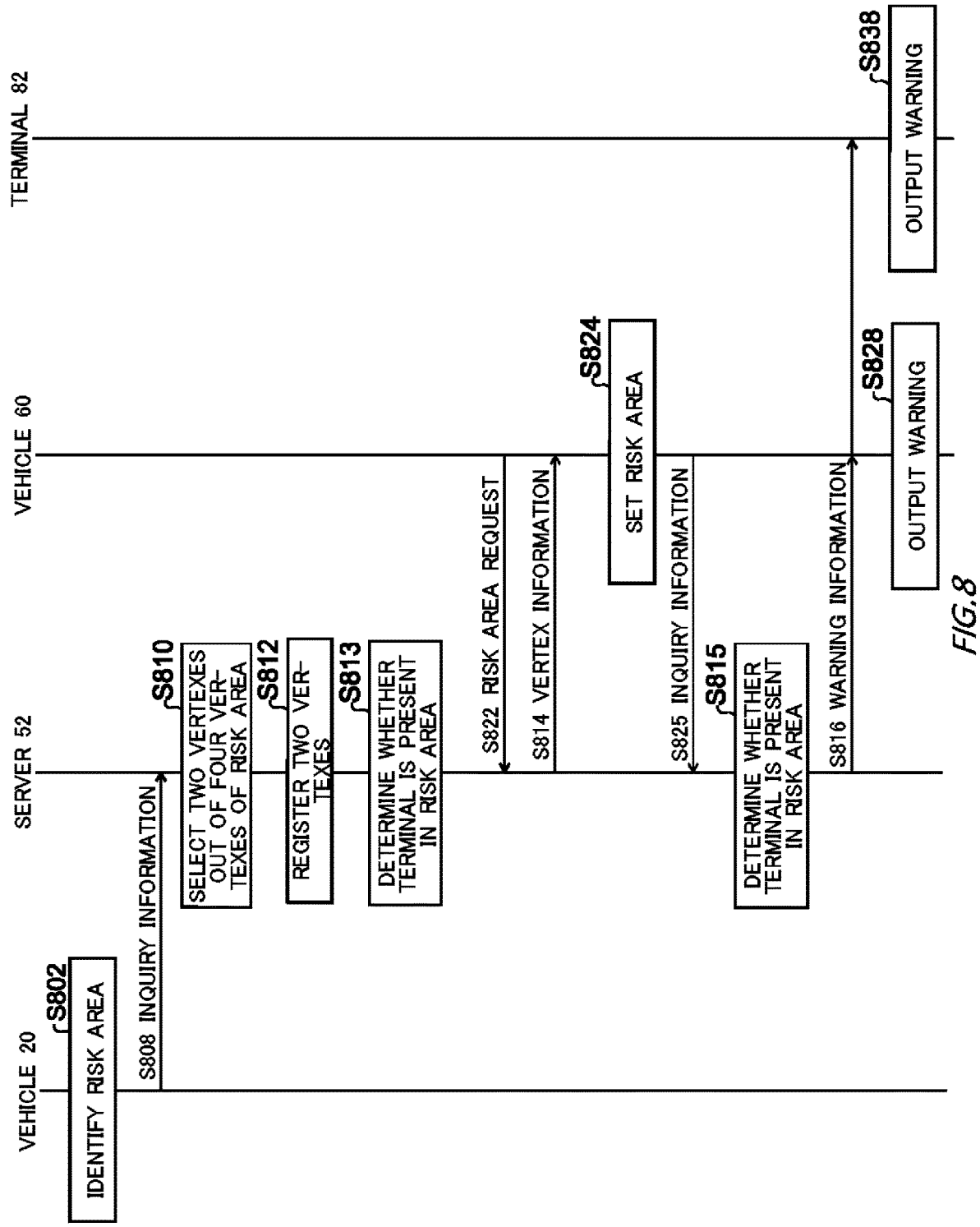
FIG. 8 schematically illustrates a flow of processing related to an information processing method executed by the vehicle 20, the vehicle 60, the server 52, and a terminal 82.

FIG. 8 schematically illustrates a flow of processing related to an information processing method executed by the vehicle 20, the vehicle 60, the server 52, and the terminal 82. In S802, the risk area identification unit 220 identifies a risk area based on information recognized by the sensor 29. For example, the risk area identification unit 220 determines four vertexes defining the risk area 110 based on coordinate information that has been output by the sensor 29 and acquired by the coordinate information acquisition unit 210. For example, the risk area identification unit 220 identifies the risk area by determining four vertexes by the method described in relation to FIGS. 6 and 7.

In S808, the transmission control unit 250 transmits inquiry information on whether a predetermined target is present in the risk area. The inquiry information includes coordinate information of the four vertexes defining the risk area identified in S802. The inquiry information may include geographic coordinate information expressed by latitudes and longitudes of the four vertexes defining the risk area. The inquiry information may include information representing a current position of the vehicle 20 or a traveling direction of the vehicle 20.

When the server 52 receives the inquiry information transmitted from the vehicle 20, in S810, the retention control unit 310 selects two vertexes that satisfy a predetermined condition out of the four vertexes included in the inquiry information based on the inquiry information received by the reception control unit 360. For example, the retention control unit 310 selects two vertexes closest to the vehicle 20 out of the four vertexes. Specifically, of the four vertexes, the retention control unit 310 may select the vertex 111 and the vertex 112 shown in FIG. 6, or select the vertex 711 and the vertex 712 shown in FIG. 7.

In S812, the retention control unit 310 registers coordinate information of the two vertexes selected in S810 as vertex information of the risk area. For example, the retention control unit 310 causes the storage unit 380 to store the coordinate information of the two vertexes selected in S810 as the vertex information of the risk area.

Further, in S813, the determination unit 320 determines whether the terminal 82 is present in an area defined by the four vertexes included in the inquiry information received from the vehicle 20. For example, in the situation shown in FIG. 1, the determination unit 320 determines that the terminal 82 is not present in the area 110 defined by the four vertexes included in the inquiry information. In this case, the transmission control unit 350 does not need to cause response information with respect to the inquiry information from the vehicle 20 to be transmitted to the vehicle 20. It is to be noted that when the terminal 82 is not present in the area defined by the four vertexes included in the inquiry information, the transmission control unit 350 may cause response information notifying that the target is not present in the risk area to be transmitted to the vehicle 20.

After that, in S822, the information processing apparatus 64 of the vehicle 60 transmits a risk area request that requests location information of the risk area to the server 52. The risk area request may include information representing a position of the vehicle 60 and a traveling direction of the vehicle 60. In S814, the transmission control unit 350 causes, based on the risk area request, vertex information of a risk area present up ahead in the traveling direction of the vehicle 60 out of the vertex information of the risk areas stored in the storage unit 380 to be transmitted to the vehicle 60.

In S824, when determined that the vehicle 60 has approached a position represented by the vertex information based on the current position of the vehicle 60 and the vertex information received from the server 52, the information processing apparatus 64 sets a risk area based on the two vertexes represented by the vertex information and the vehicle speed of the vehicle 60. For example, as described in relation to FIG. 3, the information processing apparatus 64 determines the vertex 123 and the vertex 124 based on the coordinates of the two vertexes 111 and 112 and the distance L2, and sets the area 120 defined by the vertex 111, the vertex 112, the vertex 113, and the vertex 114 as the risk area. In S825, the information processing apparatus 64 transmits inquiry information including the four vertexes of the risk area set in S824 to the server 52.

When the server 52 receives the inquiry information transmitted from the vehicle 60, in S815, the determination unit 320 determines whether the terminal 82 is present in an area defined by the four vertexes included in the inquiry information received from the vehicle 60. For example, in the situation shown in FIG. 3, the determination unit 320 determines that the terminal 82 is present in the area 120 defined by the four vertexes included in the inquiry information. In this case, in S816, the transmission control unit 350 causes warning information notifying that the terminal 82 is present in the area to be transmitted to the vehicle 60 as response information with respect to the inquiry information via the communication apparatus 348. Further, the transmission control unit 350 causes warning information notifying that the vehicle is approaching to be transmitted to the terminal 82 via the communication apparatus 348.

Upon receiving the warning information from the server 52, in S828, the information processing apparatus 64 outputs a warning with respect to the passenger of the vehicle 60 using the HMI function of the information output apparatus 40. Further, upon receiving the warning information from the server 52, in S838, the terminal 82 outputs a warning with respect to the person 80 using the HMI function of the terminal 82.

Figure 9:
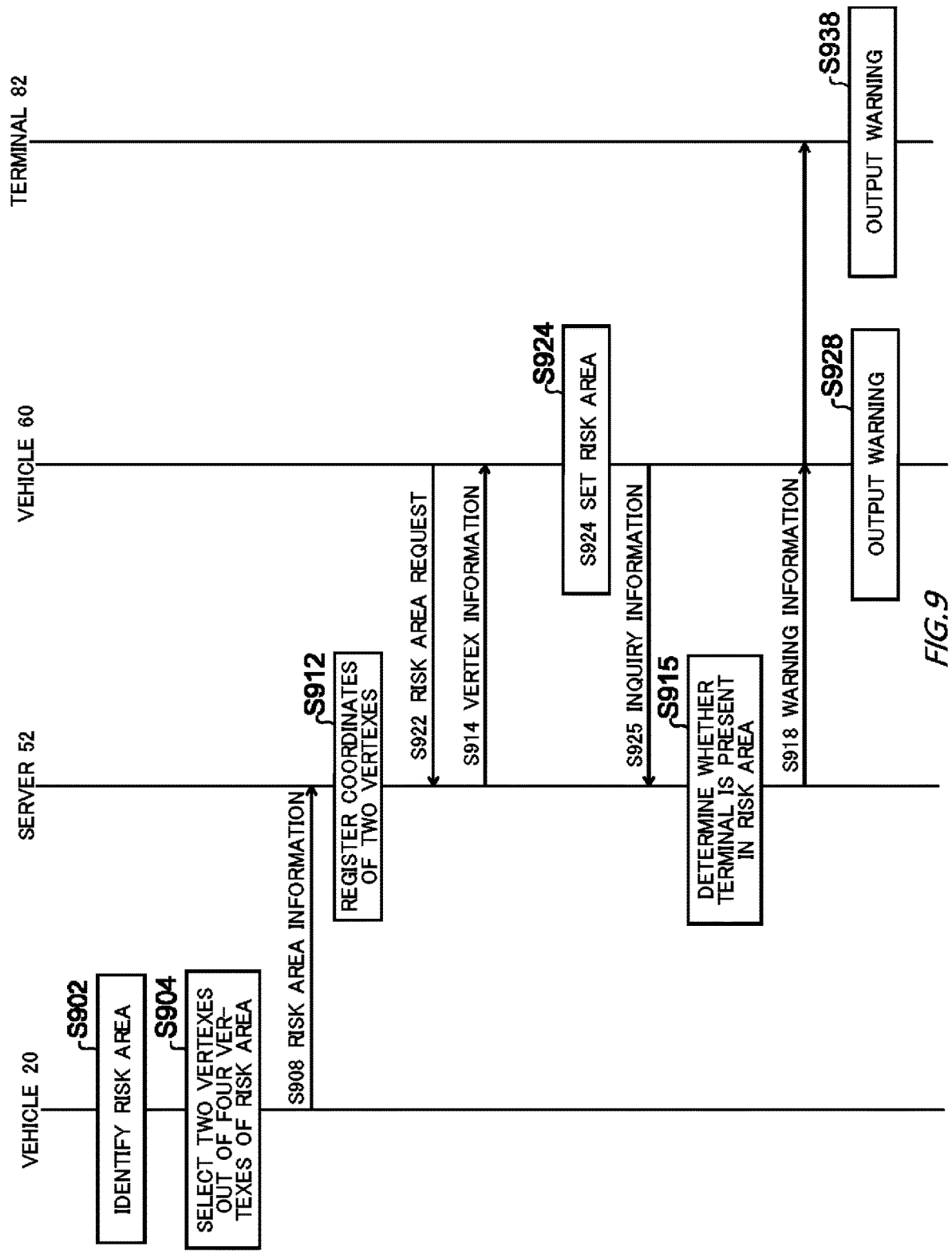
FIG. 9 schematically illustrates a flow related to another information processing method executed by the vehicle 20, the vehicle 60, the server 52, and the terminal 82.

FIG. 9 schematically illustrates a flow related to another information processing method executed by the vehicle 20, the vehicle 60, the server 52, and the terminal 82. The information processing method shown in FIG. 9 is an information processing method in a case where, when the information processing apparatus 24 identifies a risk area, the information processing apparatus 24 selects two vertexes and transmits them to the server 52.

In S902, the risk area identification unit 220 identifies a risk area based on information recognized by the sensor 29. The processing of S902 is the same as the processing of S802, so descriptions will be omitted.

In S904, the transmission control unit 250 selects two vertexes that satisfy a predetermined condition out of four vertexes of the risk area identified in S902. For example, the transmission control unit 250 selects two vertexes closest to the vehicle 20 out of the four vertexes. Specifically, of the four vertexes, the transmission control unit 250 may select the vertex 111 and the vertex 112 shown in FIG. 6, or select the vertex 711 and the vertex 712 shown in FIG. 7. In S908, the transmission control unit 250 causes risk area information including coordinate information of the two vertexes selected in S904 to be transmitted to the server 52 via the communication apparatus 48. The coordinate information of the two vertexes included in the risk area information may include geographic coordinate information expressed by latitudes and longitudes of the two vertexes selected in S904.

When the server 52 receives the risk area information transmitted from the vehicle 20, in S912, the retention control unit 310 registers the coordinate information of the two vertexes included in the risk area information as vertex information of the risk area. For example, the retention control unit 310 causes the storage unit 380 to store the coordinate information of the two vertexes included in the risk area information as the vertex information of the risk area.

After that, in S922, the information processing apparatus 64 of the vehicle 60 transmits a risk area request that requests location information of the risk area to the server 52. The processing of S922 is the same as the processing of S822. In S924, the information processing apparatus 64 sets the risk area based on the current position of the vehicle 60 and the vertex information received from the server 52. The processing of S924 is the same as the processing of S824. In S925, the information processing apparatus 64 transmits inquiry information including the four vertexes of the risk area set in S924 to the server 52.

When the server 52 receives the inquiry information transmitted from the vehicle 60, in S915, the determination unit 320 determines whether the terminal 82 is present in an area defined by the four vertexes included in the inquiry information received from the vehicle 60. The processing of S915 is the same as the processing of S815. When the determination unit 320 determines that the terminal 82 is present in the area 120 defined by the four vertexes included in the inquiry information, in S918, the transmission control unit 350 causes warning information notifying that the terminal 82 is present in the area to be transmitted to the vehicle 60 as response information with respect to the inquiry information via the communication apparatus 348. Further, the transmission control unit 350 causes warning information notifying that a vehicle is approaching to be transmitted to the terminal 82 via the communication apparatus 348.

In S928, upon receiving the warning information from the server 52, the information processing apparatus 64 outputs a warning with respect to the passenger of the vehicle 60 using the HMI function of the information output apparatus 40. Moreover, in S938, upon receiving the warning information from the server 52, the terminal 82 outputs a warning with respect to the person 80 using the HMI function of the terminal 82.

As described above, since the server 52 stores the two vertexes out of the four vertexes defining the area 110 identified by the vehicle 20, a storage capacity requisite for managing the risk area can be reduced. Further, since the server 52 transmits coordinate information of the two vertexes stored in the server 52 to the vehicle 60, a communication amount requisite for providing the coordinate information of the risk area to the vehicle 60 can be reduced. Furthermore, since the information processing apparatus 24 of the vehicle 20 transmits the two vertexes out of the four vertexes defining the area 110 when transmitting the risk area information for registering the risk area in the server 52, a communication amount requisite for registering the risk area in the server 52 can be reduced. According to the present embodiment, the processing related to the risk area can be executed with ease.

It is to be noted that for the communication between the information processing apparatus 24 and the server 52, a communication system conforming to Cellular-V2X may be adopted. Cellular-V2X includes communication systems such as LTE-V2X PC5 and 5G-V2X PC5. In another embodiment, for the communication between the information processing apparatus 24 and the server 52, a form that uses Wi-Fi (registered trademark) or DSRC (Dedicated Short Range Communications) may also be adopted. For the communication between the information processing apparatus 24 and the server 52, any communication system other than Cellular-V2X, DSRC (registered trademark), and the like, such as Bluetooth (registered trademark), may be adopted. The information processing apparatus 24 may communicate with the server 52 using a communication infrastructure of ITS (Intelligent Transport Systems).

It is to be noted that the vehicle 20 and the vehicle 60 are each an example of transportation equipment. The transportation equipment may include an automobile such as a passenger car and a bus, a saddle riding type vehicle, a bicycle, and the like. Moreover, although the system 10 functions as a system for performing warning when the terminal 82 is present in the risk area in the present embodiment described above, the system 10 may also function as a system for performing warning when any communication apparatus other than the terminal 82, whose location information can be managed by the server 52, is present. Such a communication apparatus may be provided in any moving object such as an automobile, a saddle riding type vehicle, and a bicycle.

As described above, the present embodiment has been made in view of the circumstance that the processing related to a risk area cannot be performed with ease, and thus the present embodiment aims at suppressing lowering of traffic smoothness while improving a traffic safety.

Figure 10:
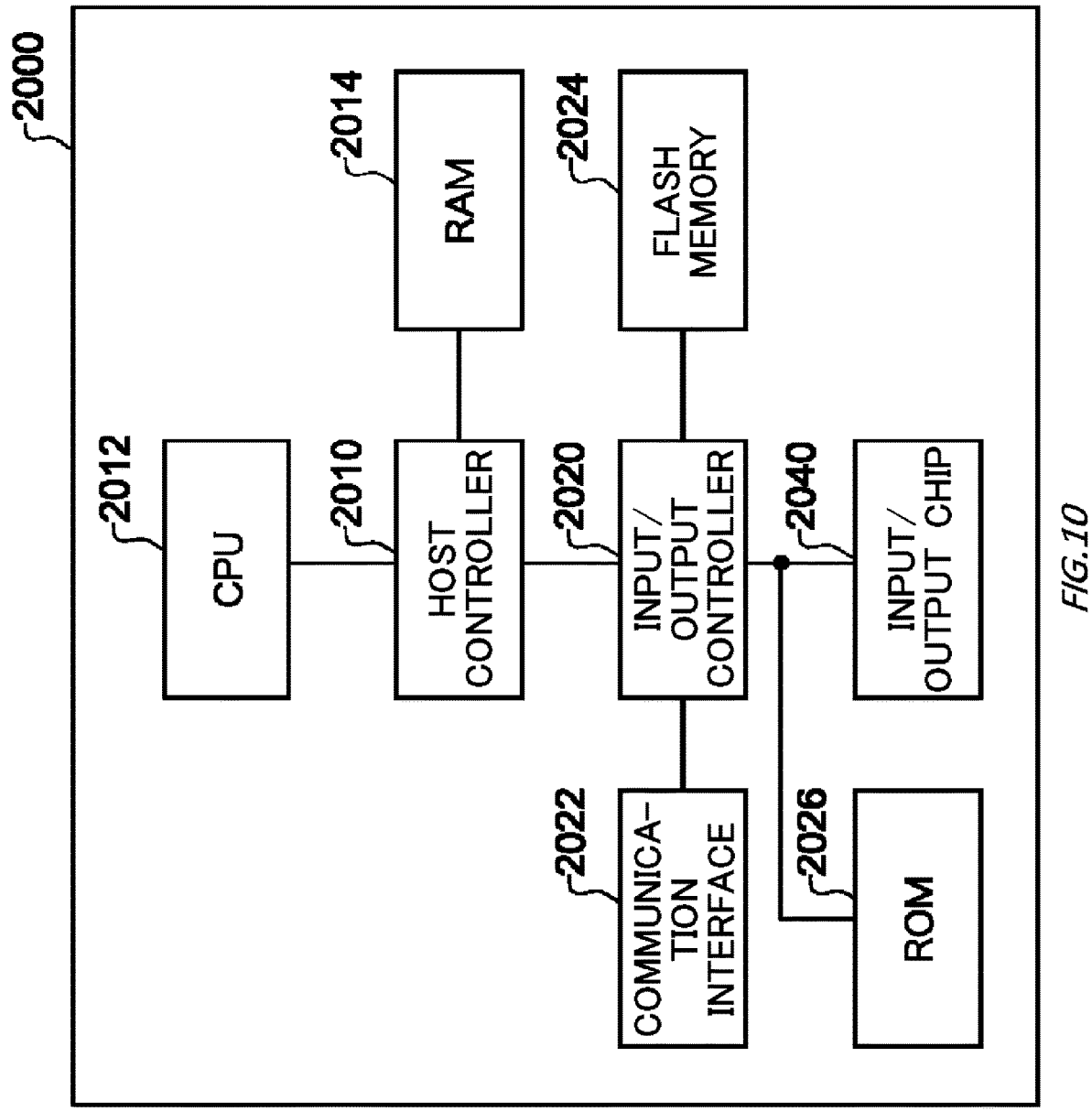
FIG. 10 shows an example of a computer 2000.

FIG. 10 shows an example of a computer 2000 in which a plurality of embodiments of the present invention may be entirely or partially embodied. Programs installed in the computer 2000 can cause the computer 2000 to function as an apparatus such as the information processing apparatus 24 according to the embodiment or the respective units of the apparatus or function as a server such as the server 52 according to the embodiment or the respective units of the server, or can cause the computer 2000 to execute operations associated with the apparatus, the respective units of the apparatus, the server, or the respective units of the server, and/or can cause the computer 2000 to execute a process according to the embodiment or steps of the process. Such a program may be executed by a CPU 2012 to cause the computer 2000 to execute certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. An apparatus or method may be constituted by realizing the operation or processing of information according to a use of the computer 2000.

For example, when communication is executed between the computer 2000 and an external device, the CPU 2012 may execute a communication program loaded onto the RAM 2014 to instruct the communication interface 2022 to carry out communication processing based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, and execute various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may execute various types of processing on the data read from the RAM 2014, which includes various types of operations, information processing, conditional judging, conditional branch, unconditional branch, search/replace of information, and the like, as described herein and designated by an instruction sequence of programs, and writes the result back to the RAM 2014. In addition, the CPU 2012 may search for information in a file, a database, and the like in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The program or software module described above may be stored in a computer-readable medium on the computer 2000 or near the computer 2000. A recording medium such as a hard disk or a RAM provided in a server system connected to a dedicated communication network or the Internet can be used as a computer-readable medium. The program stored in the computer-readable medium may be provided to the computer 2000 via the network.

When causing the computer 2000 to function as the control unit 200, a program that is installed in the computer 2000 and causes the computer 2000 to function as the control unit 200 may work on the CPU 2012 or the like to cause the computer 2000 to function as the respective units of the control unit 200. Information processing written in these programs functions as each unit of the control unit 200 that is specific means by which software and the above-described various hardware resources cooperate by being read by the computer 2000. Then, by the specific means realizing calculation or processing of information according to a purpose of use of the computer 2000 in the present embodiment, the unique control unit 200 according to the purpose of use is constructed.

When causing the computer 2000 to function as the control unit 300, a program that is installed in the computer 2000 and causes the computer 2000 to function as the control unit 300 may work on the CPU 2012 or the like to cause the computer 2000 to function as the respective units of the control unit 300. Information processing written in these programs functions as each unit of the control unit 300 that is specific means by which software and the above-described various hardware resources cooperate by being read by the computer 2000. Then, by these specific means realizing calculation or processing of information according to a purpose of use of the computer 2000 in the present embodiment, the unique control unit 300 according to the purpose of use is constructed.

Various embodiments have been described by referring to the block diagrams and the like. In the block diagram, each block may represent (1) a step of a process in which an operation is executed, or (2) each unit of the apparatus having a role of executing the operation. Certain steps and respective units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

A computer-readable medium may include any tangible device that can store instructions to be executed by a suitable device, and as a result, the computer-readable medium having the instructions stored thereon constitutes at least a part of an article of manufacture including instructions which can be executed to create means for executing operations specified in the processing procedures or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, special purpose computer, or other programmable data processing apparatus, or to programmable circuitry, locally or via a local area network (LAN) or a wide area network (WAN) such as the Internet, to execute the computer-readable instructions to provide means for executing described processing procedures or operations specified in the block diagrams. Examples of the processor include a computer processor, a processing unit, a microprocessor, a digital signal processor, a controller, a microcontroller, and the like.

While the present invention have been described with the embodiments, the technical scope of the present invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20, 60, 90: vehicle; 21: radar; 22: camera; 24: information processing apparatus; 25: GNSS reception unit; 26: vehicle speed sensor; 29: sensor; 40: information output apparatus; 48: communication apparatus; 50: base station; 52: server; 64: information processing apparatus; 70: road; 80: person; 82: terminal; 110, 120: area; 111, 112, 113, 114, 123, 124: vertex; 200: control unit; 208: control unit; 210: coordinate information acquisition unit; 220: risk area identification unit; 250: transmission control unit; 260: reception control unit; 280: storage unit; 300: control unit; 310: retention control unit; 320: determination unit; 348: communication apparatus; 350: transmission control unit; 360: reception control unit; 380: storage unit; 601, 602, 603, 701, 702, 703: position; 710: area; 711, 712, 713, 714: vertex; 2000: computer; 2010: host controller; 2012: CPU; 2014: RAM; 2020: input/output controller; 2022: communication interface; 2024: flash memory; 2026: ROM; 2040: input/output chip.

What is claimed is:

1. An information processing apparatus, comprising:
    at least one processor;
    a risk area identification unit configured to identify, using the at least one processor, a risk area outside a moving object; and
    a transmission control unit configured to perform, using the at least one processor, control for transmitting risk area information representing the risk area identified by the risk area identification unit to a server configured to retain information related to a risk area, wherein
    the risk area identification unit is further configured to identify, using the at least one processor, an area defined by a plurality of points as the risk area,
    the transmission control unit is further configured to perform, using the at least one processor, control for transmitting coordinate information of some of the plurality of points to the server as the risk area information,
    a number of the plurality of points is three or more,
    the some points are two points out of the plurality of points, and
    the some points are two points closest to a position of the moving object out of the plurality of points.

2. The information processing apparatus according to claim 1, wherein
    the some points are points which satisfy a predetermined condition out of the plurality of points.

3. The information processing apparatus according to claim 2, wherein
    the some points are two points farthest apart from each other in a direction intersecting with a traveling direction of the moving object out of the plurality of points.

4. The information processing apparatus according to claim 2, further comprising:
    a coordinate information acquisition unit configured to acquire, using the at least one processor, coordinate information of an object recognized from an image obtained by capturing an outside of the moving object by an image capturing apparatus mounted on the moving object, wherein
    the risk area identification unit is further configured to identify, using the at least one processor, the risk area based on the coordinate information.

5. The information processing apparatus according to claim 2, further comprising:
    a coordinate information acquisition unit configured to acquire, using the at least one processor, coordinate information of an object recognized from an image obtained by capturing an outside of the moving object by an image capturing apparatus mounted on the moving object, wherein
    the coordinate information includes, as coordinates of each of a plurality of points defining a position of the object, first relative coordinates in a first direction along a traveling direction of the moving object and second relative coordinates in a second direction intersecting with the first direction,
    the risk area identification unit is further configured to identify, using the at least one processor, based on the coordinate information, an area defined by three or more points included in the coordinate information as the risk area, and
    the transmission control unit is further configured to select, using the at least one processor, two points closest to the position of the moving object out of the three or more points based on the first relative coordinates included in the coordinate information, and determine the some points based on the selected two points.

6. The information processing apparatus according to claim 1, further comprising:
a coordinate information acquisition unit configured to acquire, using the at least one processor, coordinate information of an object recognized from an image obtained by capturing an outside of the moving object by an image capturing apparatus mounted on the moving object, wherein
the risk area identification unit is further configured to identify, using the at least one processor, the risk area based on the coordinate information.

7. The information processing apparatus according to claim 1, further comprising:
a coordinate information acquisition unit configured to acquire, using the at least one processor, coordinate information of an object recognized from an image obtained by capturing an outside of the moving object by an image capturing apparatus mounted on the moving object, wherein
the coordinate information includes, as coordinates of each of a plurality of points defining a position of the object, first relative coordinates in a first direction along a traveling direction of the moving object and second relative coordinates in a second direction intersecting with the first direction,
the risk area identification unit is further configured to identify, using the at least one processor, based on the coordinate information, an area defined by three or more points included in the coordinate information as the risk area, and
the transmission control unit is further configured to select, using the at least one processor, two points closest to the position of the moving object out of the three or more points based on the first relative coordinates included in the coordinate information, and determine the some points based on the selected two points.

8. The information processing apparatus according to claim 1, wherein
the plurality of points are a plurality of vertexes defining the area identified as the risk area.

9. The information processing apparatus according to claim 1, wherein
the server includes a mobile edge computing (MEC) server.

10. The information processing apparatus according to claim 1, wherein
the moving object is a vehicle.

11. A vehicle, comprising:
the information processing apparatus according to claim 10.

12. A system, comprising:
the information processing apparatus according to claim 1; and
the server.

13. An information processing apparatus, comprising:
at least one processor;
a risk area identification unit configured to identify, using the at least one processor, a risk area outside a moving object; and
a transmission control unit configured to perform, using the at least one processor, control for transmitting risk area information representing the risk area identified by the risk area identification unit to a server configured to retain information related to a risk area, wherein
the risk area identification unit is further configured to identify, using the at least one processor, an area defined by a plurality of points as the risk area,
the transmission control unit is further configured to perform, using the at least one processor, control for transmitting coordinate information of some of the plurality of points to the server as the risk area information,
a number of the plurality of points is three or more,
the some points are two points out of the plurality of points, and
the some points are two points farthest apart from each other in a direction intersecting with a traveling direction of the moving object out of the plurality of points.

14. An information processing method, comprising:
identifying a risk area outside a moving object; and
performing control for transmitting risk area information representing the identified risk area to a server configured to retain information related to a risk area, wherein
the identifying a risk area includes identifying an area defined by a plurality of points as the risk area,
the performing control for transmission includes performing control for transmitting coordinate information of some of the plurality of points to the server as the risk area information,
a number of the plurality of points is three or more,
the some points are two points out of the plurality of points, and
the some points are two points closest to a position of the moving object out of the plurality of points.

15. A server, comprising:
at least one processor;
a reception control unit configured to perform, using the at least one processor, control for receiving risk area information representing a risk area outside a moving object, which has been identified by the moving object; and
a retention control unit configured to perform, using the at least one processor, control for retaining information related to the risk area, wherein
the risk area information includes a plurality of points defining the risk area,
the retention control unit is further configured to perform, using the at least one processor, control for selecting some of the plurality of points included in the risk area information, and retaining coordinate information of the selected some points,
a number of the plurality of points is three or more,
the some points are two points out of the plurality of points, and
the some points are two points closest to a position of the moving object out of the plurality of points.

16. A system, comprising:
the server according to claim 15; and
the moving object.

* * * * *